United States Patent [19]

Suenaga

[11] Patent Number: 5,324,795
[45] Date of Patent: Jun. 28, 1994

[54] POLYMER BLEND COMPOSITION FOR MELT MOLDING

[75] Inventor: Jun-ichi Suenaga, Kyoto, Japan

[73] Assignee: Unitika Ltd., Hyogo, Japan

[21] Appl. No.: 59,601

[22] Filed: May 12, 1993

Related U.S. Application Data

[63] Continuation of Ser. No. 642,769, Jan. 18, 1991, abandoned.

[30] Foreign Application Priority Data

Jan. 19, 1990 [JP] Japan ..................................... 2-11659

[51] Int. Cl.$^5$ ...................... C08L 67/02; C08L 67/03; C08L 67/04
[52] U.S. Cl. .................................... 525/444; 525/65; 525/68; 525/132; 525/151; 525/395; 525/396; 525/397; 525/423; 525/424; 525/425; 525/437; 525/438; 525/439; 525/440; 525/450; 525/466
[58] Field of Search ......................................... 525/444

[56] References Cited

U.S. PATENT DOCUMENTS

| | | | |
|---|---|---|---|
| 3,959,215 | 5/1976 | Schneider | 525/437 |
| 4,141,882 | 2/1979 | Kodama | 525/438 |
| 4,438,236 | 3/1984 | Cogswell | 525/444 |
| 4,451,611 | 5/1984 | Cincotta | 525/51 |
| 4,460,735 | 7/1984 | Froix | 524/537 |
| 4,728,698 | 3/1988 | Isayev | 525/439 |
| 4,788,251 | 11/1988 | Brown | 525/67 |
| 4,904,746 | 2/1990 | Brown | 525/438 |
| 4,933,429 | 6/1990 | McCracken | 528/272 |
| 5,171,778 | 12/1992 | Dekkers | 524/539 |

*Primary Examiner*—Patricia A. Short
*Attorney, Agent, or Firm*—Sughrue, Mion, Zinn, Macpeak & Seas

[57] ABSTRACT

The present invention relates to a polymer blend composition for melt molding which is a composition obtained by adding a thickener to a polymer blend comprising a liquid crystal polymer and a non-liquid crystal polymer, characterized in that the melt viscosity of the composition determined at a molding temperature at a shear rate of 1000 sec$^{-1}$ is the same or higher than the melt viscosity of said non-liquid crystal polymer determined under the same conditions.

According to the present invention, a polymer blend for melt molding having improved properties, whereby problems observed in prior arts upon molding a polymer blend comprising a liquid crystal polymer and a non-liquid crystal polymer (for example, insufficient alignment of the liquid crystal polymer and difficulties in extrusion, because of excessively low melt viscosity) can be solved, is obtained.

3 Claims, No Drawings

POLYMER BLEND COMPOSITION FOR MELT MOLDING

This is a continuation of application Ser. No. 07/642,769, filed Jan. 18, 1991 now abandoned.

FIELD OF THE INVENTION

This invention relates to a polymer blend for melt molding which comprises a liquid crystal polymer and a non-liquid crystal polymer and which is capable of giving molded articles of improved properties.

BACKGROUND OF THE INVENTION

A liquid crystal polymer (a thermotropic liquid crystal polymer) has a rigid backbone in its molecule and forms liquid crystals in a molten state. It can be easily aligned under a shear force upon molding so as to give a molded article having a high strength, a high modulus, an excellent impact resistance and a small coefficient of linear expansion.

Thus, attempts have been frequently made to blend such a liquid crystal polymer with a non-liquid crystal polymer to thereby improve the properties of said non-liquid crystal polymer by taking advantage of the aforesaid excellent characteristics of the liquid crystal polymer.

For example, C. Kiss et al. [Polymer Engineering & Science, 27, 410 (1987)] reports that a liquid crystal polymer blended with a common engineering plastic and molded would be dispersed in such a manner as to form fibrils and thus exert a reinforcing effect to thereby enhance the modulus. And, T. S. Chung [Plastic Engineering, 39 (1987)] reports that a molded article produced by blending Nylon 12 with a liquid crystal polymer and molding has a small coefficient of linear expansion.

Further, U.S. Pat. Nos. 4,451,611 and 4,489,190 each shows that blending a wholly aromatic liquid crystal polyester with a polyalkylen terephtarate improves in its mechanical properties.

Furthermore, U.S. Pat. No. 4,386,174 discloses that the flowability of a non-liquid crystal polymer can be improved by blending a liquid crystal polymer therewith.

Although a molded article produced by blending a non-liquid crystal polymer with a liquid crystal polymer has an improved flowability, it suffers from such disadvantages that the excessively low melt viscosity thereof cannot give a shear stress sufficient for the alignment of the liquid crystal polymer and that the alignment, once achieved, undergoes relaxation before the completion of the cooling and solidifying, which deteriorates the reinforcing effect. In addition, the excessively low melt viscosity makes extrusion difficult.

SUMMARY OF THE INVENTION

It is an object of the present invention to provide a polymer blend for melt molding capable of giving molded articles of improved properties to thereby solve the aforesaid problems observed during the molding of a polymer blend comprising a non-liquid crystal polymer and a liquid crystal polymer, namely, the insufficient alignment of the liquid crystal polymer and difficulties in extrusion, because of excessively low melt viscosity.

Accordingly, the gist of the present invention, which aims at achieving the above object, resides in a polymer blend composition comprising a liquid crystal polymer, a non-liquid crystal polymer and a thickener, said liquid crystal polymer and said non-liquid crystal polymer having at least one molding temperature in common, and said liquid crystal polymer having group(s) capable of reacting with said thickener at said molding temperature, wherein the melt viscosity of said blend determined at the molding temperature and a shear rate of $1000 \text{ sec}^{-1}$ is the same as or higher than the melt viscosity of said non-liquid crystal polymer determined under the same conditions.

DETAILED DESCRIPTION OF THE INVENTION

The liquid crystal polymer to be used in the present invention is not particularly restricted, so long as it can be molded in a molten state, has a molding temperature overlapping that of the non-liquid crystal polymer to be blended therewith and has functional group(s) capable of reacting with a thickener.

Particular examples of the liquid crystal polymer include: (1) a polyester copolymer mainly comprising a p-hydroxybenzoic acid residue unit and an ethylene terephthalate unit disclosed in U.S. Pat. Nos. 3,778,410 and 4,896,926; (2) a polyester copolymer comprising a 6-hydroxy-2-naphthoic acid residue unit and a p-hydroxybenzoic acid residue unit disclosed in U.S. Pat. No. 4,161,470; (3) a polyester copolymer comprising a p-hydroxybenzoic acid residue unit, a terephthalic acid residue unit and a dihydric phenol residue unit disclosed in U.S. Pat. No. 3,637,595; (4) a polyester copolymer comprising a phenyl hydroquinone residue unit and a terephthalic acid residue unit disclosed in U.S. Pat. No. 4,699,746; and (5) a polyester copolymer comprising a phenyl hydroquinone residue unit and a styloylhydroquinone residue unit disclosed in U.S. Pat. No. 4,600,765. Among these polymers, the liquid crystal polyesters (1) and (2) may be preferably selected, since they are excellent in mechanical properties and heat resistance, have a molding temperature of lower than 300° C. and can be blended with a number of non-liquid crystal polymers. The most preferable example of the liquid crystal polymer is the aforesaid liquid crystal polyester (1) which contains many terminal carboxyl groups capable of reacting with a thickener and thus can be easily reacted therewith.

The term "non-liquid crystal polymer" as used herein means a thermoplastic non-liquid crystal polymer which can be molded in a molten state. It is not particularly restricted, so long as it can be blended with a liquid crystal polymer so as to give a molded article.

Examples of the non-liquid crystal polymer include general-purpose plastics such as polyolefin, acryl series polymer and ABS resin, engineering plastics such as polyamide (aliphatic polyamide and amorphous polyamide), polyalkylene terephthalate, polycarbonate, modified polyphenylene oxide and polyoxymethylene, super-engineering plastics such as polysulfone, polyketone and poly-p-phenylene oxide and specialty plastics such as polyfluoroolefin and thermoplastic cellulose polymer.

The term "thickener" as used herein means a compound which reacts with at least the liquid crystal polmer to thereby enhance the melt viscosity. In order to sufficiently align a liquid crystal polymer having a low melt viscosity in a molded article, the thickener has a functional group capable of reacting with the liquid crystal polymer. As the thickener, a polyfunctional compound is to be employed. It is preferable to select a bifunctional compound therefor, since little gelation occurs upon molding and thus a molded article of excellent qualities can be obtained in this case. The thickener may be either a low molecular weight compound or a high molecular weight one. It is preferable that the thickener has a linear structure which would never deteriorate the linearity of the liquid crystal polymer.

Because a typical example of the liquid crystal polymer is a polyester having terminal carboxyl group(s), a corresponding compound having a functional group capable of reacting with carboxyl groups is used as a thickener. Examples of the functional group capable of reacting with a carboxyl group include oxazoline, epoxy, isocyanate and carbodiimide groups. A compound having oxazoline groups or epoxy groups is usually employed. It is particularly preferable to use a compound having oxazoline groups which can rapidly react with carboxyl groups at said molding temperature without showing any gelation.

A particularly preferable example of the thickener to be used for a liquid crystal polymer having terminal carboxyl group(s) is a phenylenebisoxazoline compound represented by the following formula which would rapidly react with the terminal carboxyl group of a liquid crystal polymer at a temperature of from 220° to 300° C.:

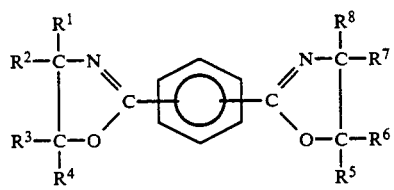

wherein $R^1$ to $R^8$ represent each a hydrogen atom or an alkyl group.

Particular examples of the phenylenebisoxazoline compound include 2,2'-p-phenylenebis(2-oxazoline), 2,2'-m-phenylenebis(2-oxazoline), 2,2'-p-phenylenebis(4-methyl-2-oxazoline), 2,2'-p-phenylenebis(4,4'-dimethyl-2-oxazoline), 2,2'-m-phenylenebis(4-methyl-2-oxazoline) and 2,2'-m-phenylenebis(4,4'-dimethyl-2-oxazoline).

The blending ratio of the liquid crystal polymer to the non-liquid crystal polymer may be determined depending on the performance of the target molded article. The content of the liquid crystal polymer is usually controlled to 5 to 50% by weight, preferably 15 to 40% by weight. For example, a molded article exhibiting the characteristics of the liquid crystal polymer (i.e., a small coefficient of linear expansion and a high modulus) being emphasized may be obtained by elevating the content of the liquid crystal polymer.

The melt molding of the liquid crystal polymer and the non-liquid crystal polymer may be performed while melt blending a solid blend. Alternately, a molten blend may be preliminarily pelletized followed by melt molding. The thickener may be added to the blend either before or during the melting stage. The thickener may be added in such an amount as to adjust the melt viscosity of the polymer blend to be the same as or higher than the melt viscosity of the non-liquid crystal polymer. The content of the thickener may usually range from 0.2 to 5% by weight, preferably from 0.5 to 3% by weight.

In the present invention, the melt viscosity is determined with a common measurement device such as a flow tester at a shear rate of 1000 sec$^{-1}$ (i.e., a typical shear rate at molding) at a molding temperature.

When the melt viscosity of the polymer blend is lower than that of the non-liquid crystal polymer, a shear stress sufficient for the alignment of the liquid crystal polymer cannot be given at molding or else the alignment, once achieved, undergoes relaxation before the completion of the cooling and solidifying, which deteriorates the reinforcing effect. It is generally preferable to adjust the melt viscosity of the polymer blend to 1,000 poise or above at the molding temperature.

The method for molding the polymer blend of the present invention is not particularly restricted. Namely, it may be molded by either injection, extrusion or pressing. In any case, it is important in order to obtain an excellent molded article to timely react the polymer with the thickener and to rapidly cool the blend following the molding. The molding temperature and pressure may be appropriately selected depending on the employed polymer blend and the properties of the target molded article.

The use of the polymer blend of the present invention makes it possible to obtain an excellent molded article wherein liquid crystal polymer molecules are aligned. The performance of the molded article may be further improved, if required, by adding various reinforcing materials and fillers to the polymer blend. For example, a reinforcing material or a filler such as glass fiber, carbon fiber, whisker, mica, talc and wollastonite may be added thereto in an amount of 60% by weight or below and an additive (for example, pigment, antioxidant, nucleating agent) may be added in an amount of from 0.2 to 10% by weight, preferably form 0.5 to 2% by weight.

To further illustrate the present invention, the following Examples will be given wherein the characteristic data were determined by the following methods.

Melt Viscosity

Determined with a flow tester (Type CFT-500 A; mfd. by Shimazu Seisakusho Ltd.) provided with a nozzle (diameter: 0.5 mm, length: 2 mm) at a shear rate of 1000 sec$^{-1}$.

Tensile Strength

Determined in accordance with ASTM D-638.

Flexural Modulus

Determined in accordance with ASTM D-790.

Impact Resistance (Izod Impact Strength: IZ)

Determined in accordance with ASTM D-256.

Heat Resistance (Heat Distortion Temperature: HDT)

Determined in accordance with ASTM D-648 under a load of 18.6 kg/cm$^2$.

Molding Shrinkage

Shrinkage in the longer direction in molding a test piece of ASTM D-790 was measured with a vernier caliper to thereby determine the shrinkage ratio.

EXAMPLES 1 TO 15 AND COMPARATIVE EXAMPLES 1 TO 19

Pellets of a liquid crystal polyester comprising 80% by mol of a p-hydroxybenzoic acid residue unit and 20% by mol of an ethylene terephthalate unit (Rodran LC-5000; mfd. by Unitika Ltd.) [LCP] were blended with each of the non-liquid crystal polymer pellets and thickeners as specified in Table 1 (expressed in part by weight), wherein the thickener had been electrostatically adhered to the blended pellets uniformly. The blended pellets thus obtained were fed into a 30 mm biaxial extruder (mfd. by Ikegai Tekko K.K.) and then mixed in a molten state therein, followed by pelletizing.

The obtained pellets were injection molded with an injection molding machine (Type J-100S, mfd. by Nippon Seikosho K.K.) at a cylinder temperature of 280° C. and a mold temperature of 80° C. to thereby give a test piece of 12.7 mm width, 127 mm length and 3.2 mm thickness.

Non-Liquid Crystal Polymer

N6: Nylon 6 (mfd. by Unitika Ltd.).
PBT: Polybutylene terephthalate (mfd. by Unitika Ltd.).
PC: polycarbonate (Panlite, mfd. by Teijin Chemical Ltd.).
NA: Amorphous nylon (CX-3000, mfd. by Unitika Ltd.).
ABS: ABS resin
(Clalastic K-2540, mfd.by Sumitomo-Naugatac Co.).
PPO: Modified polyphenylene oxide
(Nolyl 731J, mfd. by G.E. Plastics Co.).

Thickener

PBO: 2,2'-m-Phenylenebis(2-oxazoline).
EPO: Polyfunctional epoxy compound
(Bond-Fast E, mfd. by Sumitomo Chemical Co., Ltd.).

Table 1 shows the melt viscosities of polymers (blends) and characteristic data of test pieces.

EXAMPLE 16 AND COMPARATIVE EXAMPLE 20

LCP, Nylon 12 pellets (Diamide, mfd.by Daicel-Hüls, melt viscosity: 450 poise) [N-12], and PBO were blended together at each ratio as specified in Table 2. The obtained blend was then fed into a monoaxial extruder (L/D: 25, diameter: 30 mm) and extruded from a T die (thickness : 3 mm, width: 120 mm) at a temperature of 275° C. Next, the extruded matter was treated with nip rolls under a draw down ratio of approximately 1.2 to thereby give a sheet of 1 mm in thickness.

In the above extruder, the inlet temperature, the compression temperature and the tip temperature were respectively adjusted to 250° C., 270° C. and 275° C., whereas the residence time was adjusted to 2 minutes.

The center of the obtained sheet was cut in the extrusion direction (MD direction) and in the direction vertical thereto (TD direction) in such a manner as to give a width of 12.7 mm. Table 2 shows the characteristic data of the obtained sample.

In Example 16, sheets having good tensile strength and flexural modulus were easily formed.

In Comparative Example 20, the excessively low melt viscosity made the molten matter sag from the T die, so as not to be able to form a sheet.

Thus the present invention provides a polymer blend for melt molding having improved properties whereby problems observed in prior arts upon molding a polymer blend comprising a liquid crystal polymer and a non-liquid crystal polymer (for example, insufficient alignment of the liquid crystal polymer and difficulties in extrusion, because of excessively low melt viscosity, ) can be solved.

Therefore, it is expected that injection molded articles or extrusion molded articles obtained by molding the polymer blend of the present invention, wherein the characteristics of the liquid crystal polymer are fully utilized, are widely applicable in the fields, for example, of electric and electronic devices (especially connector and housing), general machineries, precise machineries, automobiles, and consumer goods.

TABLE 1

|  | Liquid crystal polymer (part) | | Non-liquid crystal (part) | | Thickener (part) | | Melt viscosity at 280° C. (poise) | Tensile strength (kg/cm$^2$) | Flexural modulus (kg/cm$^2$) | IZ (kg · cm/cm) | HDT (°C.) | Molding shrinkage (%) |
|---|---|---|---|---|---|---|---|---|---|---|---|---|
| Example 1 | LCP | 20 | N6 | 80 | PBO | 1.2 | 1200 | 800 | 35000 | 3.2 | 65 | 0.9 |
| Example 2 | LCP | 40 | N6 | 60 | PBO | 2.5 | 1400 | 910 | 45000 | 2.6 | 63 | 0.7 |
| Com. Ex. 1 | LCP | 20 | N6 | 80 |  | 0 | 600 | 680 | 26000 | 2.3 | 65 | 1.1 |
| Com. Ex. 2 | LCP | 40 | N6 | 60 |  | 0 | 450 | 550 | 32000 | 2.1 | 62 | 0.9 |
| Com. Ex. 3 | LCP | 0 | N6 | 100 |  | 0 | 900 | 750 | 26000 | 6.0 | 73 | 1.4 |
| Example 3 | LCP | 10 | PBT | 90 | PBO | 1.0 | 1100 | 620 | 28000 | 1.9 | 61 | 1.2 |
| Example 4 | LCP | 30 | PBT | 70 | PBO | 2.0 | 1300 | 780 | 42000 | 2.5 | 67 | 0.8 |
| Com. Ex. 4 | LCP | 10 | PBT | 90 |  | 0 | 700 | 540 | 24000 | 1.5 | 60 | 1.4 |
| Com. Ex. 5 | LCP | 30 | PBT | 70 |  | 0 | 500 | 570 | 28000 | 1.8 | 64 | 1.0 |
| Com. Ex. 6 |  | 0 | PBT | 100 |  | 0 | 1100 | 570 | 24000 | 4.4 | 58 | 1.7 |
| Example 5 | LCP | 10 | PC | 90 | PBO | 0.6 | 1900 | 650 | 28000 | 40 | 136 | 0.9 |
| Example 6 | LCP | 20 | PC | 80 | PBO | 1.4 | 2000 | 720 | 33000 | 28 | 143 | 0.7 |
| Example 7 | LCP | 40 | PC | 60 | PBO | 2.0 | 2000 | 830 | 45000 | 16 | 146 | 0.7 |
| Com. Ex. 7 | LCP | 10 | PC | 90 |  | 0 | 1500 | 600 | 23000 | 28 | 136 | 1.1 |
| Com. Ex. 8 | LCP | 20 | PC | 80 |  | 0 | 1300 | 680 | 24000 | 19 | 142 | 0.9 |
| Com. Ex. 9 | LCP | 40 | PC | 60 |  | 0 | 1100 | 740 | 32000 | 10 | 144 | 1.4 |
| Com. Ex. 10 |  | 0 |  | 100 |  | 0 | 1800 | 620 | 23000 | 85 | 134 | 1.4 |
| Example 8 | LCP | 10 | PBT | 90 | EPO | 0.4 | 1300 | 610 | 27000 | 2.5 | 60 | 1.2 |
| Example 9 | LCP | 30 | PBT | 70 | EPO | 0.7 | 1500 | 770 | 39000 | 3.1 | 65 | 0.8 |
| Example 10 | LCP | 20 | NA | 80 | PBO | 1.0 | 1500 | 1300 | 42000 | 3.0 | 131 | 0.6 |
| Example 11 | LCP | 40 | NA | 60 | PBO | 1.6 | 1800 | 1500 | 52000 | 3.0 | 133 | 0.5 |
| Com. Ex. 11 | LCP | 20 | NA | 80 |  | 0 | 1100 | 800 | 35000 | 2.0 | 130 | 0.7 |
| Com. Ex. 12 | LCP | 40 | NA | 60 |  | 0 | 900 | 700 | 42000 | 2.0 | 131 | 0.5 |
| Com. Ex. 13 |  | 0 | NA | 100 |  | 0 | 1500 | 1000 | 31000 | 4.0 | 130 | 0.8 |
| Example 12 | LCP | 20 | ABS | 80 | PBO | 1.0 | 1100 | 550 | 26000 | 7.0 | 86 | 0.4 |
| Example 13 | LCP | 40 | ABS | 60 | PBO | 2.0 | 1400 | 650 | 32000 | 6.0 | 88 | 0.3 |
| Com. Ex. 14 | LCP | 20 | ABS | 80 |  | 0 | 650 | 500 | 24000 | 4.0 | 83 | 0.4 |
| Com. Ex. 15 | LCP | 40 | ABS | 60 |  | 0 | 500 | 580 | 28000 | 3.0 | 86 | 0.4 |

TABLE 1-continued

| | Liquid crystal polymer (part) | | Non-liquid crystal (part) | | Thickener (part) | | Melt viscosity at 280° C. (poise) | Tensile strength (kg/cm$^2$) | Flexural modulus (kg/cm$^2$) | IZ (kg·cm/cm) | HDT (°C.) | Molding shrinkage (%) |
|---|---|---|---|---|---|---|---|---|---|---|---|---|
| Com. Ex. 16 | | 0 | ABS | 100 | | 0 | 1000 | 460 | 20000 | 20.0 | 85 | 0.5 |
| Example 14 | LCP | 20 | PPO | 80 | PBO | 1.0 | 1900 | 680 | 28000 | 4.0 | 130 | 0.5 |
| Example 15 | LCP | 40 | PPO | 60 | PBO | 2.0 | 2200 | 750 | 35000 | 4.0 | 134 | 0.4 |
| Com. Ex. 17 | LCP | 20 | PPO | 80 | | 0 | 1500 | 650 | 27000 | 3.0 | 128 | 0.5 |
| Com. Ex. 18 | LCP | 40 | PPO | 60 | | 0 | 1200 | 630 | 32000 | 3.0 | 128 | 0.5 |
| Com. Ex. 19 | | 0 | PPO | 100 | | 0 | 1800 | 630 | 25000 | 18.0 | 128 | 0.6 |

TABLE 2

| | Liquid crystal polymer (part) | | Non-liquid crystal (part) | | Thickener (part) | | Melt viscosity at 275° C. (poise) | Tensile strength (kg/cm$^2$) | | Flexural modulus (kg/cm$^2$) | |
|---|---|---|---|---|---|---|---|---|---|---|---|
| | | | | | | | | MD direction | TD direction | MD direction | TD direction |
| Example 16 | LCP | 30 | N12 | 70 | PBO | 1.2 | 1050 | 580 | 380 | 32000 | 12000 |
| Com. Ex. 20 | LCP | 30 | N12 | 70 | | 0 | 250 | no sheet could be formed because of excessively low melt viscosity | | | |

While the invention has been described in detail and with reference to specific examples thereof, it will be apparent to one skilled in the art that various changes and modifications can be made therein without departing from the spirit and scope thereof.

What is claimed is:

1. A polymer blend composition comprising 5 to 50% by weight of a liquid crystal polyester consisting essentially of p-hydroxybenzoic acid residue unit and ethylene terephthalate unit, a thermoplastic non-liquid crystal polymer selected from the group consisting of polyalkylene terephthalates, and 0.2 to 5% by weight of a thickener selected from the group consisting of bisoxazoline compounds, said thickener being a polyfunctional compound having functional groups capable of reacting with the carboxy groups of the polyester at a molding temperature; said liquid crystal polyester and said non-liquid crystal polymer having at least one molding temperature in common, and said liquid crystal polyester having group(s) capable of reacting with said thickener at said molding temperature, wherein the melt viscosity of said blend determined at the molding temperature and a shear rate of 1,000 sec$^{-1}$ is the same as or higher than the melt viscosity of said non-liquid crystal polymer determined under the same conditions and is 1,000 poise or more at the molding temperature.

2. A composition as claimed in claim 1, wherein said liquid crystal polyester is one which can be molded at a temperature of 300° C. or below.

3. A composition as claimed in claim 1, wherein said thickener is a phenylenebisoxazoline compound.

* * * * *